United States Patent [19]

Wehrmann et al.

[11] Patent Number: 4,978,732
[45] Date of Patent: Dec. 18, 1990

[54] COATED SUPPORTS WITH ULTRA-THIN, SINGLE-LAYER OR MULTI-LAYER COATING, PROCESS FOR THEIR PRODUCTION AND POLYURETHANES AS INTERMEDIATES FOR THE COATED SUPPORTS

[75] Inventors: Rolf Wehrmann; Heinrich-Christian Schopper, both of Krefeld, Fed. Rep. of Germany; Dittmar K. Nerger, Pittsburgh, Pa.

[73] Assignee: Bayer Aktiengesellschaft, Leverkusen, Fed. Rep. of Germany

[21] Appl. No.: 387,748

[22] Filed: Aug. 1, 1989

[30] Foreign Application Priority Data

Aug. 12, 1988 [DE] Fed. Rep. of Germany ....... 3827438

[51] Int. Cl.$^5$ .............................................. C08G 18/32
[52] U.S. Cl. ........................................ 528/71; 528/73; 528/85; 560/26; 560/115; 560/158; 427/385.5; 428/423.1
[58] Field of Search ............... 528/71, 73, 85; 560/26, 560/115, 158; 427/385.5; 428/423.1

[56] References Cited

U.S. PATENT DOCUMENTS 4,762,899 8/1988 Shikinami ............................ 528/85

Primary Examiner—Maurice J. Welsh
Attorney, Agent, or Firm—Sprung Horn Kramer & Woods

[57] ABSTRACT

Coated supports with ultra-thin, single-layer or multi-layer coating of organic polymer material have been found, in which, as polymer, polyurethanes of the structure

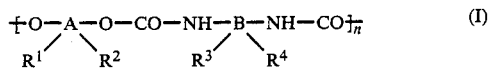
$$\{O-\underset{\underset{R^1}{/}\underset{R^2}{\backslash}}{A}-O-CO-NH-\underset{\underset{R^3}{/}\underset{R^4}{\backslash}}{B}-NH-CO\}_n \qquad (I)$$

are used in which
A is the skeleton of an aliphatic, araliphatic or aromatic diol,
B is the skeleton of an aliphatic, araliphatic or aromatic diisocyanate,
n assumes values from 2 to 150 and at least one of the substituents $R^1$ to $R^4$ represents an essentially normal-chain aliphatic radical and the others in each case denote hydrogen, the aliphatic radical having at least 4 carbon atoms and the number of carbon atoms from the terminal methyl group of the aliphatic radical via the skeleton A or B up to the urethane linkage being 6 to 40, and it being further possible for $R^1$ and $R^2$ jointly to form an alkylene chain and for $R^3$ and $R^4$ jointly to form an alkylene chain. Coated supports of this type may be produced by the Langmuir-Blodgett technique. The polyurethanes mentioned are novel intermediates for these coated supports.

10 Claims, 9 Drawing Sheets

COATED SUPPORTS WITH ULTRA-THIN, SINGLE-LAYER OR MULTI-LAYER COATING, PROCESS FOR THEIR PRODUCTION AND POLYURETHANES AS INTERMEDIATES FOR THE COATED SUPPORTS

BACKGROUND OF THE INVENTION

1. Field of the invention

The present invention relates to novel coated supports with ultra-thin, single-layer or multi-layer coating, in which the coating material is a polyurethane, further to a process for the production of coated supports of this type and to novel polyurethanes as intermediates for these coated supports.

Coated supports find a multiplicity of uses in industrial technology. For example, the frictional properties of materials may be adapted for a desired purpose by modifying the surface. Furthermore, a protective film may be used for the underlying support in order to preserve their particular surface characteristics. Recently however, coated supports have been used in particular as components in structural elements for optical communications technology and as electronic and optoelectronic information storage.

In particular for the electronic and optical applications it is necessary to produce ultra-thin, defect-free, multi-layer coatings, whose layers have a high degree of order and an adjustable coating thickness which is as homogeneous as possible, it being intended that this high degree of order should also be maintained in the range of a high number of coating layers.

The thin coatings produced from the organic polymers here constitute the basis for defect-free systems which are ordered at the molecular level, as required for example for

- optical applications (directional radiation with low attenuation, for example optical fibres with nonlinear optical properties),
- electrical applications (electrical conductors with high anisotropy, for example unidimensional or twodimensional conductors in the field of molecular electronics),
- "host lattices" for the defined incorporation or a specific bonding of functional groups or molecules (for example biomolecules for sensors).

2. Description of the related art

It is already known to produce monomolecular layers from amphiphilic low molecular weight molecules each having a polar and a nonpolar end, such as long chain fatty acids, on the surface of a nonsolvent such as water, in which layers all the polar ends are directed towards the water for example, while the nonpolar ends project into the gas space above. For this purpose small amounts of amphiphilic substances of this type are dissolved in a suitable solvent and, for example, poured on an aqueous surface of adequate size, where, with evaporation of the solvent, they spread to form a monomolecular layer which initially is not cohesive. By displacing a suitable barrier the aqueous surface is diminished and the associated increase in the surface tension is measured as a function of the surface which still remains available (i.e. plotting thrust-surface diagrams, also termed $\pi/A$ isotherms, which are known to those skilled in the art).

A cohesive monomolecular layer which is ordered at the molecular level is thus produced. On reaching this quasisolid state of this monomolecular layer, further displacement of this barrier meets with a clearly measurable resistance, which indicates that this state has been reached. Suitable supports may then be dipped into the water through the monomolecular layer and on dipping in and/or on withdrawal are themselves covered, with a monomolecular layer of the amphiphilic substance, in which the molecular order is retained in the individual coatings.

The operation mentioned may be repeated. This coating technique is known to those skilled in the art as the Langmuir-Blodgett technique.

Coatings of monomeric amphiphilic substances are however chemically, thermally and mechanically unstable, i.e. the molecular order may be lost by chemical and/or physical influences. It has thus been attempted, to absorb amphiphilic materials having a reactive double or multiple bond onto supports and subsequently to crosslink them to form a polymer, for example by means of high energy radiation.

Diacetylenecarboxylic acids and tricosoic acid are examples which have been investigated many times for the polymerization of unsaturated amphiphilic substances. The serious disadvantage of these substances is their high reactivity, as a result of which they may often be obtained in pure form only with difficulty. Defects, such as macroscopic cracks in the coating, often occur by shrinkage in the course of the polymerization after transfer onto the support.

There have also already been attempts to include polymeric substances such as polystyrene and polymethyl methacrylate in the Languir-Blodgett technique. However, polymers are associated with difficulty in ordering the polar and the non-polar structural components, on the one hand due to the statistical disorder in the polymer chain, and on the other hand due to the super lattices of the polymers. It has thus constantly to be investigated whether the degree of amphiphilic behaviour (i.e. the difference in polarity between the polar and the nonpolar groups) is sufficient in order to achieve coatings with high molecular order and high reproducibility. Here, the so-called Y-structure is often sought, in which, in multi-layer coatings, the polar and the nonpolar structural elements are in each case located opposite one another from one layer to another. For particular applications, for example nonlinear optically active coatings, this Y-structure may be a disadvantage; with the polyurethanes described further below coatings of the X or Z type may also be produced under suitable experimental conditions. In Journal of Molecular Electronics 1 (1985), 3-17 the subject matter referred to is set out in detail.

SUMMARY OF THE INVENTION

Coated supports with ultra-thin, single-layer or multi-layer coating of organic polymer material have now been found, which are characterized in that, as polymer, polyurethanes of the structure (I)

are used in which

A is the skeleton of an aliphatic, araliphatic or aromatic diol,

B is the skeleton of an aliphatic, araliphatic or aromatic diisocyanate, n assumes values from 2 to 150 and
at least one of the substituents $R^1$ to $R^4$ represents an essentially normal-chain aliphatic radical and the others in each case denote hydrogen, the aliphatic radical having at least 4 carbon atoms and the number of carbon atoms from the terminal methyl group of the aliphatic radical via the skeleton A or B up to the urethane linkage being 6 to 40, it being possible for this chain of carbon atoms to contain an O atom or N atom in the region of the skeleton A or B, and it being further possible for $R^1$ and $R^2$ jointly to form an alkylene chain and for $R^4$ and $R^4$ jointly to form an alkylene chain.

Moreover, a process for the production of coated supports of this type has been found, which is characterized in that a solution of the said polyurethanes is applied to the surface of a liquid in which neither the polyurethane nor its solvent dissolve, and a substrate is coated by the Langmuir-Blodgett technique with the desired number of coating layers.

The invention further relates, as an essential part, to the said novel polyurethanes as intermediates for the coated supports.

BRIEF DESCRIPTION OF THE DRAWINGS

FIGS. 1,1 through 1,5 show, in connection with the examples, various $\pi/A$ isotherms obtained by application of various polyurethanes as the coatings.

DETAILED DESCRIPTION OF THE INVENTION

In the polyurethanes of the formula (I) the urethane linkages represent in each case the polar groups, while the essentially normal-chain aliphatic radicals $R^1$ to $R^4$ represent the nonpolar groups. The aliphatic radicals are essentially normal-chain, i.e. they have a degree of branching of a maximum of one methyl group per 8 carbon atoms in the chain. With very long chains the branching may also be short $C_2$-$C_4$ chains within the scope of the degree of branching mentioned. Preferably however, strictly normal-chain aliphatic radical are present in the polyurethane according to the invention.

At least one of the substituents $R^1$ to $R^4$ represents an essentially normal-chain aliphatic radical, while those substituents $R^1$ to $R^4$ which do not denote aliphatic radicals of this type represent hydrogen. The aliphatic radicals have at least 4 carbon atoms, for example 4-38, preferably 6-28, particularly preferably 6-22 carbon atoms. The aliphatic radicals are bonded to the carbon skeleton A or B. In a case such as this, the number of carbon atoms from the terminal methyl group of the aliphatic radical via the skeleton A or B up to the urethane linkage is 6-40, preferably 8-30, particularly preferably 8-24. However, for example, in the case of polyols, it is also possible to bond essentially normalchain aliphatic radicals to one or more hydroxyl groups, so that from all the OH groups only two remain and thus in each case a diol results from the polyol. In cases of this kind, the chain of carbon atoms of the aliphatic radical contains an O atom in the region of the skeleton A or B. In the event that the diol contains a N atom (for example in N,N-di(hydroxyethyl)-amine, which can be alkylated or quaternized with a long chain substituent, the bond of the aliphatic radical with the skeleton of the diol occurs via a N atom.

Although in principle the substituents $R^1$ and $R^2$ or $R^3$ and $R^4$ may have different chain lengths, it is however preferred that $R^1$ and $R^2$ are identical and $R^3$ and $R^4$ are also identical, but may be different from $R^1$ and $R^2$. Preferred polyurethanes are those in which $R^1$ or $R^1$ and $R^2$ represent an aliphatic radical and $R^3$ and $R^4$ denote hydrogen. Particularly preferred polyurethanes are those in which $R^1$ and $R^2$ represent an aliphatic radical and $R^3$ and $R^4$ denote hydrogen. Furthermore, $R^1$ and $R^2$ may jointly form an alkylene chain and likewise $R^3$ and $R^4$ may jointly form an alkylene chain, alkylene chain which may have for example $2\times4=8$ to about 40 carbon atoms. Preferably, in this case also, only $R^1$ and $R^2$ jointly form an alkylene chain while $R^3$ and $R^4$ denote hydrogen.

Essentially normal-chain aliphatic radicals and alkylene chains formed from $R^1$ and $R^2$ together or from $R^3$ and $R^4$ together, of the type mentioned, are familiar to those skilled in the art.

Polyurethanes of the formula (I) may be produced in a manner known to those skilled in the art from diols of the formula

(II)

and diisocyanates of the formula (III)

in which
$R^1$, $R^2$, $R^3$ and $R^4$ have the meaning given above.

In principle instead of the diisocyanates (III) biscarbamoyl chlorides of the formula (IV)

may also be used in which
$R^3$ and $R^4$ likewise have the meaning given above.

Because of to the well known polyurethane reaction technique it is preferable, however, to react the diols (II) with the diisocyanates (III), the splitting off of corrosive hydrogen chloride being simultaneously avoided.

A and B may independently of one another be the skeleton of an aliphatic, cycloaliphatic, aromatic or araliphatic diol or diisocyanate (optionally biscarbamoyl chloride). The aliphatic part may for example have 2-32, preferably 3-20, particularly preferably 4-12 carbon atoms. The cycloaliphatic part may for example have 6-15, preferably 6-12, particularly preferably 6-8 carbon atoms. The araliphatic part may for example have 7-15, preferably 7-10 carbon atoms. The aromatic part may for example have 6-15, preferably 6-12, particularly preferably 6-10 carbon atoms. Radicals of this type are known to those skilled in the art from polyure- thane chemistry relating to diols or diisocyanates (or biscarbamoyl chlorides).

Aromatic parts of A or B may moreover be linked by a $C_1$-$C_6$ alkylene or cycloalkylene group.

Aliphatic parts of A may moreover be branched and carry 1 to 3 further OH groups, preferably 1 or 2 further OH groups, to which the essentially normal-chain aliphatic radical is bonded, so that ultimately a diol remains. Examples of diols of the last-mentioned type are: glycerol monostearate, trimethylolpropane monostearate or pentaerythritol distearate, which for example can be produced after blocking two OH groups and reacting with a long-chain acyl chloride. In these cases the carbon atom chain from the terminal methyl group up to the hydroxyl group (or up to the urethane group formed therefrom) contains an O atom near this hydroxy group. The former for example includes 2,2-distearyl-1,3-propanediol, which can be produced by single or double alkylation of malonic acid ester with long chain alkyl halides and subsequent reduction of both ester groups.

Aliphatic parts of A may moreover contain a N atom, which may be alkylated or quaternized with the aid of long chain alkyl halides. In such a case, the carbon atom chain contains a N atom instead of a O atom.

The diode given as examples can be represented in terms of formulae as follows:

in which
$R^6$ = $C_{12}H_{28}$, $C_{14}H_{28}$, $C_{16}H_{33}$, $C_{18}H_{37}$ and so on,
$R^7$ = H or $R^6$ and Hal$^-$ = Cl or Br$^-$.

Diisocyanates substituted by $R^3$ and/or $R^4$ are accessible in a corresponding manner via the diamines on which they are based.

In the preferred case, in which $R^3$ and $R^4$ represent hydrogen, the following diisocyanates may be mentioned for example as suitable according to the invention: tetramethylene diisocyanate, hexamethylene diisocyanate, dodecamethylene diisocyanate, 1,4-diisocyanatocyclohexane, 1-isocyanato-3-isocyanatomethyl-3,5,5-trimethylcyclohexane (isophorone diisocyanate), 4,4'-diisocyanatodicyclohexylmethane, 4,4'-diisocyanato-2,2-dicyclohexylpropane, 1,3- or 1,4-diisocyanatobenzene, 2,4- or 2,6-diisocyanatotoluene, or mixtures of these isomers, 4,4'-or 2,4'-diisocyanato-diphenylmethane, 4,4'-diisocyanato2,2-diphenylpropane, p-xylylene diisocyanate and α, α, α', α', -tetramethyl-m- or -p-xylylene diisocyanate, 1,5-diisocyanatonaphthaline and mixtures comprising these compounds.

The degree of polymerization of the polyurethanes according to the invention is indicated by the index n with values from 2 to 150, preferably 3 to 100. Polyurethanes of this type generally occur as a mixture with different degrees of polymerization. These mixtures may be used directly for coating solid substrates.

Suitable substrates for the coated supports according to the invention are plane or differently shaped, preferably symmetrical dimensionally stable work pieces. They may be optically transparent or opaque and may be electrically conducting, semi-conducting or insulating.

The surface of a substrate may, for example, itself consist of an insulator with a conductive metal coating applied to it or conversely may consist of a metal and a covering of an insulating coating. The surface of the substrate should as far as possible have only slight microroughnesses (in the range of 20–100 Å in accordance with DIN 4768), in order to achieve the high order within the coated supports according to the invention. Apart from the plane form of the substrate, the form of cylinders or half cylinders and of spherical segments is also suitable for example. The surface of the substrates can moreover be rendered hydrophilic or hydrophobic by physical or chemical treatment. Generally the substrate surfaces are subjected to cleansing before coating. The solid substrates may consist either of inorganic or of organic materials. Examples of inorganic materials are metals and alloys, such as gold, platinum, nickel, palladium, aluminium, chromium, steel and so on and nonmetals or oxide materials such as silicon, silicon dioxide, glass, graphite, mica and ceramic materials. From the group of organic materials polymeric materials may particularly be mentioned, such as polyesters (polyethylene terephthalate, polybutylene terephthalate and so on), polyvinyl chloride, polyvinylidene fluoride, polytetrafluoroethylene, polycarbonate, polyamide and so on. The intended use in each case determines the selection of the substrate. Thus, transparent or reflective substrates are used for example in optical investigations or applications. If electrical properties are of interest, metallized and consequently conducting or semi-conducting substrates (for example silicon or ITO, (ITO=Indium Tin Oxide) or else, if required, insulators, are used.

Dimensionally stable, flat, plane substrates such as films, foils, tapes and so on are particularly suitable. The coating may be applied on one side or both sides.

Solutions of the polyurethanes are produced within the context of the Langmuir-Blodgett technique. Suitable solvents are methylene chloride, chloroform, trichloroethane, ethane, benzene, hexane, ethyl acetate and similar solvents known to those skilled in the art, and mixtures thereof. Only in a few cases must more strongly polar solvents, such as methanol, ethanol, dimethyl sulphoxide, dimethylformamide or N-methylpyrrolidone, be added in order to improve the solubility. The concentration of polyurethane solutions of this type is generally adjusted to $10^{-2}$ to $10^{-4}$ mol/l. A solution of this type is introduced onto the surface of a liquid in which neither the polyurethane nor its solvent dissolve. The most important of these liquids is water or aqueous solutions of salts, acids or bases, preferably pure water. The more higher polar solvents mentioned above may only be added in minor amounts in order not to make the solvent for the polyurethane too readily soluble in water.

While the solvent is evaporating and small amounts of the more highly polar solvent are taken up by the water the polyurethane dissolved therein spreads and is compressed to the desired transfer pressure with the aid of a movable barrier, so that a closed layer is present which is ordered on the molecular scale ("quasi-solid" or "solide-like" phase). Then, by dipping in the support, the coating is carried out, being repeated to correspond to the coating layers are desired. This transfer is generally carried out at a temperature of 5°-35° C., preferably 10°-30° C.

The statistical entanglement of the chains and other irregularities which can be observed with polymers would also lead to an expectation of corresponding imperfections in the coated supports. Surprisingly, this is the case only to a substantially lesser degree with the coated supports according to the invention, so that multilayer coatings with a high degree of order and virtually uniform, adjustable coating thicknesses are achieved.

EXAMPLES

Starting materials and equipment

The polyurethanes (PUs) employed were produced in the conventional manner by reacting the diols with the diisocyanates in solution and purified by reprecipitation. The PUs are represented by the following formulae:

PU-1

PU-2

PU-3

PU-4

PU-5

PU-6

-continued

PU-7

A commercially available film balance supplied by KSV Chemicals, Helsinki was used to produce the single coatings and multiple coatings. The effectively useable trough surface area was 1275 cm² during measurement of the $\pi/A$ isotherm and 1175 cm² during the coating experiments. The speed of advance of the barrier during the measurement of $\pi/A$ isotherms was 31 mm/min, which corresponded to a surface area reduction of 7750 mm²/min; while building up multiple coatings, the barrier speed was in each case adjusted to the monolayer characteristics. Various $\pi/A$ isotherms are shown in FIGS. 1.1 to 1.5, of which only the course shown in FIG. 1.1 is discussed in more detail, since the results are directly transferable to the other Examples. FIG. 1.1 was recorded with PU 1, FIG. 1.2 with PU 2, FIG. 1.3 with PU 3, FIG. 1.4 with PU 4 and FIG. 1.5 with PU 5.

Figure 11:
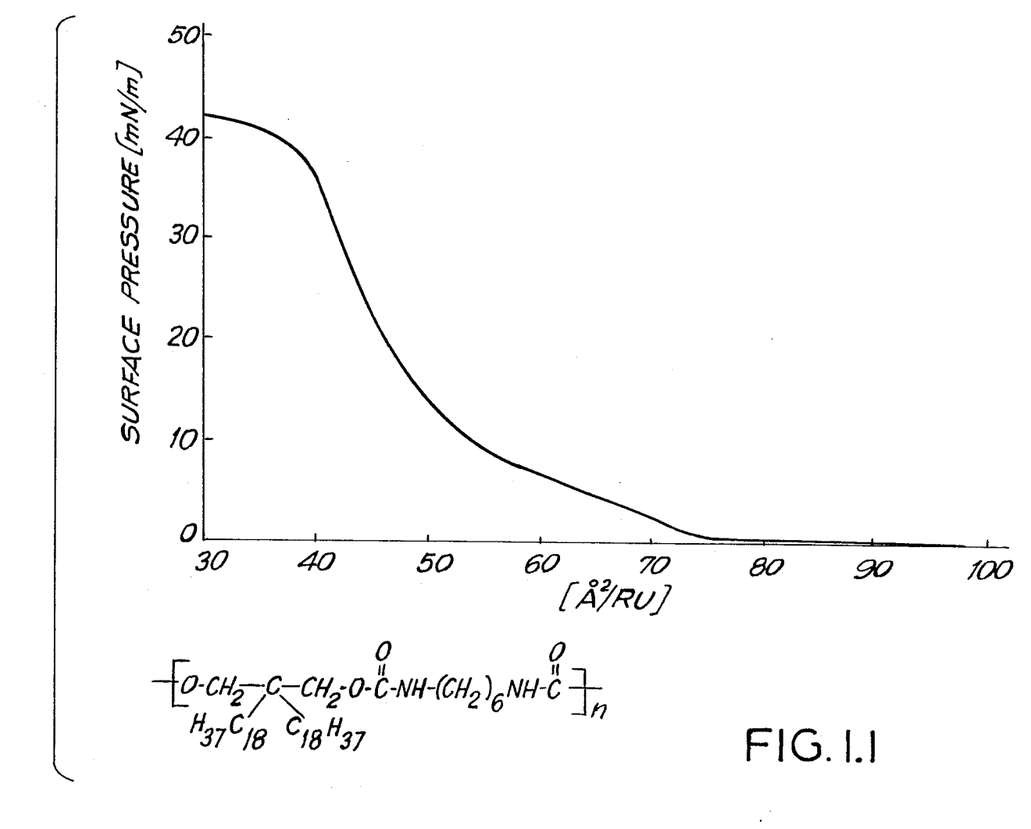
Figure 12:
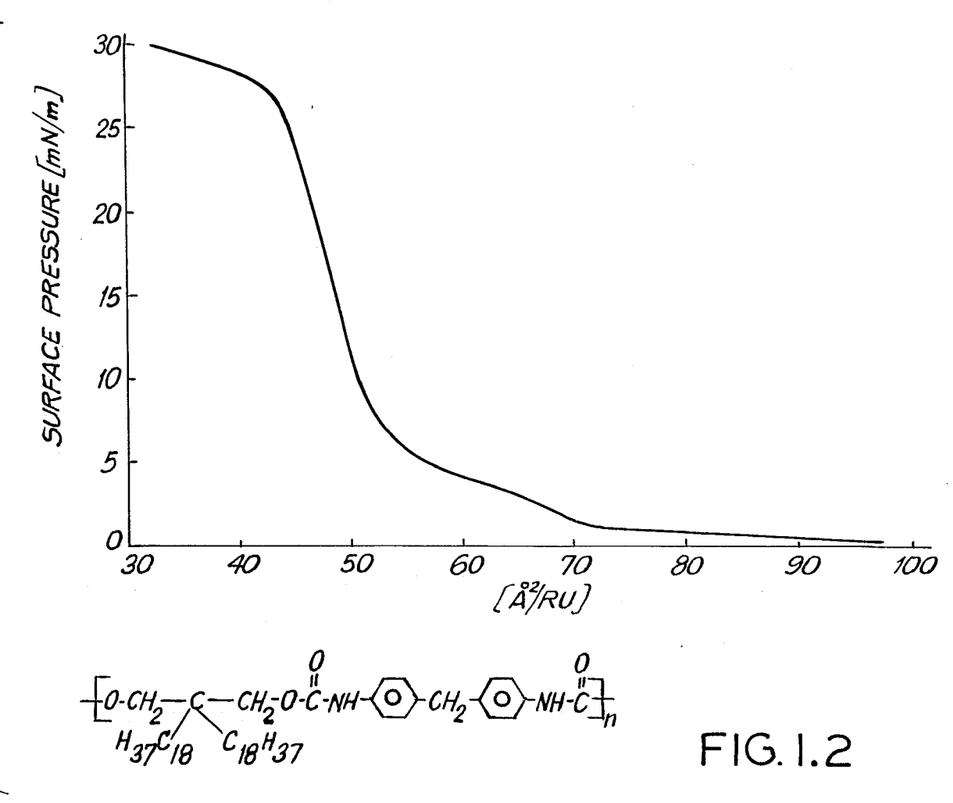
Figure 13:
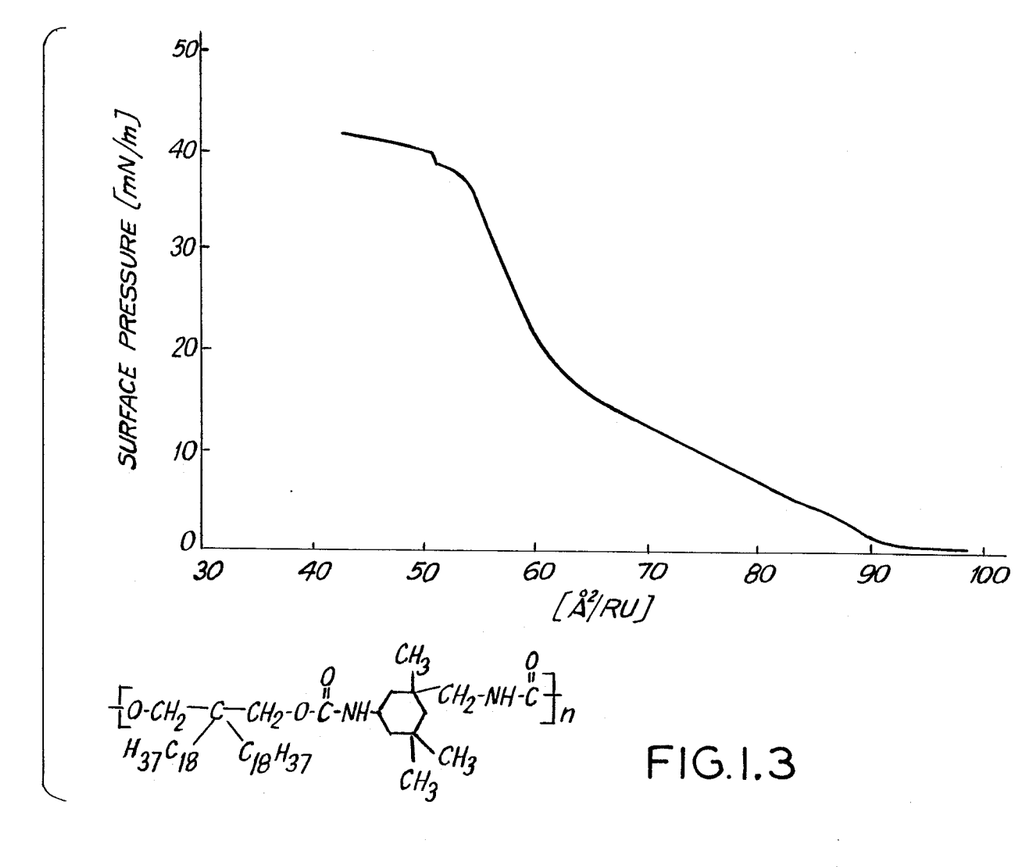
Figure 14:
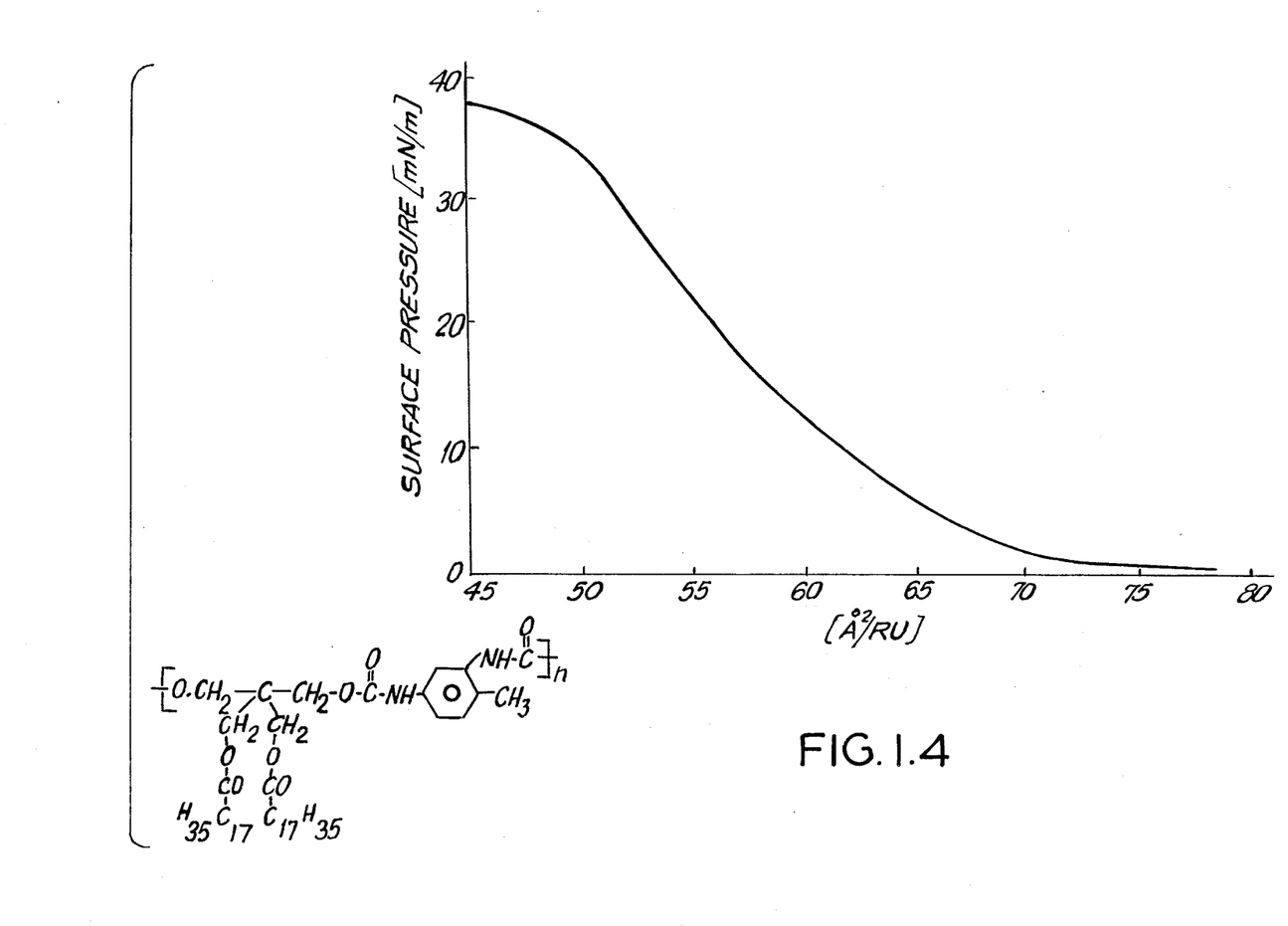
Figure 15:
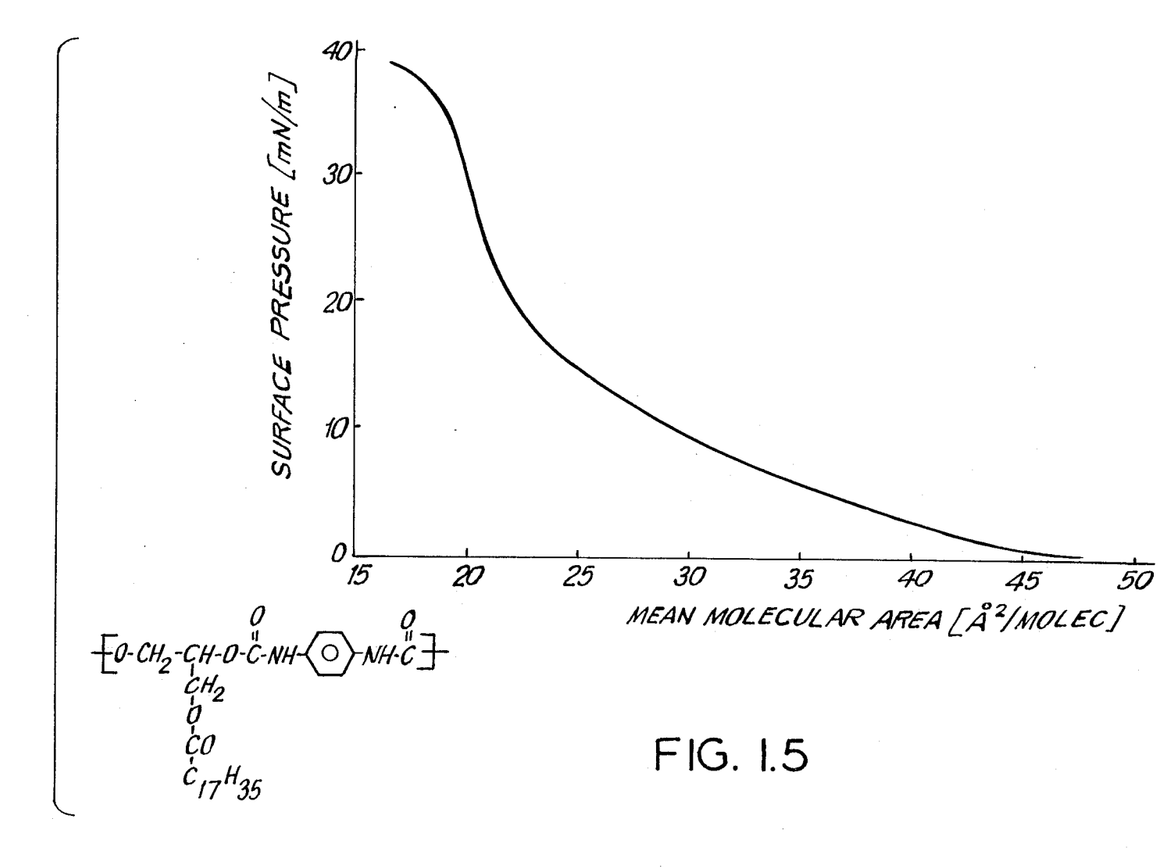

In order to record this $\pi/A$ isotherm, 12.11 mg of polyurethane were dissolved in 10 ml of chloroform (analytically pure), ($1.62 \times 10^{-3}$ mol/l). The amount applied was 100 $\mu$l. Measurement was carried out at room temperature. A noticeable increase in pressure occurred from about 75 Å²/RU (RU=Repeat Unit). The collapse point was at 40 Å²/RU and a pressure of about 36 mN/m. The surface area requirement of 40 Å²/RU at the collapse point is in good agreement with the expected value known from the literature for double-chain amphiphiles, since the surface area requirement of an alkyl chain is 18-20 Å². The polyurethane measured was obtained from a double-chain diol and a diisocyanate. It can be seen that it is virtually exclusively the two alkyl chains which contribute to the surface area requirement. It may thus be concluded from the course of the $\pi/A$ isotherms that the polymer backbone lies flat on the water surface with its polar urethane groups and the nonpolar alkyl side chains project into the gas space. Thus, even when they are incorporated into a polyurethane, the orientation of the hydrophilic and of the hydrophobic groups is directly comparable with that in conventional the amphiphiles such as long chain fatty acids or alcohols.

In every case, silicon (Wacker-Chemitronic) served as the substrate for the multiple coatings, whose assessment by measuring techniques is dealt with in the following text. Platelets 40 mm in length and 8 mm in width were cut out from disks ("wafers") 1 mm in thickness and 3 inches in diameter, polished on both sides, and after cleansing from dust and chemical contamination in the ultrasound bath were coated by the Langmuir-Blodgett technique.

Inspection of the coating surfaces by interference contrast microscopy (magnification $\times 100$ to $\times 500$) revealed very smooth, homogeneous surfaces: occasional defects occurring are due to damage to the substrate, which arose during cutting, and dust.

The thickness of the multi coatings was determined pointby-point ellipsometrically at a wavelength of 632.8 nm (He-Ne laser), (instrument: Rudolf Research, type Auto-EL); the angle of incidence was 70°, and the diameter of the measuring spot about 1 mm. For each multiple coating, the mean of 15 to 25 individual measurements was taken (step size 1/10 to 1/20 inch with a microsledge); the maximum experimental error was $\pm 0.5$ Å.

From the ellipsometer angles $\gamma$ and $\Delta$ of the total system (support and coating) and of the uncoated support, the corresponding angular values of the coating were calculated and the total coating thickness determined from these.

Figure 2:
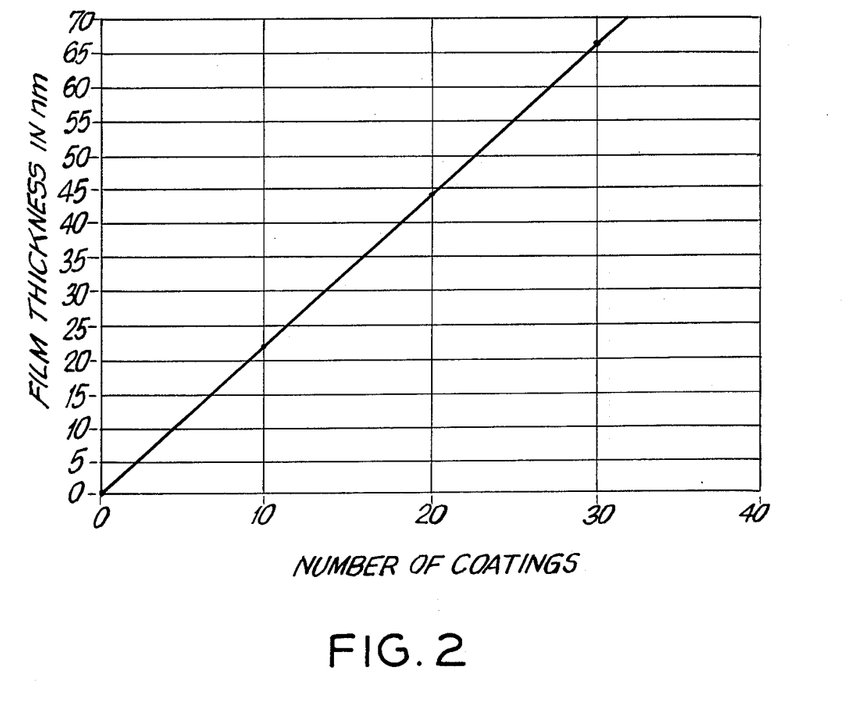
FIG. 2 shows the result of an ellipsometric determination of coating thickness on a test speciment having regions which had been dipped different numbers of times.

FIG. 2 shows the result of a point-by-point ellipsometric determination of coating thickness on a test specimen from Table 1 having regions which had been dipped differing numbers of times (10 times, 20 times and 30 times), i.e. having regions which consist of stacks of 10, 20 and 30 individual coatings of PU 1. A linear relationship exists between the total coating thickness and the number of dipping cycles. It is thus proved, that each individual coating of the polyurethane makes the same contribution to the total coating, i.e. that in forming the multiple coatings, coating upon coating is transferred reproducibly and in an identical manner, which is the prerequisite for a well ordered molecular organization. The average thickness $d_o$ of an individual coating is derived from the slope of the straight line in FIG. 2 ($d_o$ is equal to the film thickness, divided by the number of coatings). It is $22.0 \pm 0.8$ Å (error limits: standard deviation of 0.3 Å plus experimental error of a maximum of 0.5 Å) and is in good agreement with literature values for double chain phospholipids of related structure. In an analogous manner, a value of $22.7 \pm 3.9$ Å was determined as the average coating thickness $d_o$ of an individual coating for PU 6.

The structure of the multiple coatings was investigated using X-ray diffraction. A gravitationally symmetrical Xray diffractometer was used (Seifert, type GSD) with Cu-$K_{\alpha 1}$ radiation ($\lambda = 1.5405$ Å). The diffraction diagrams were recorded in the region of the primary ray $2° < 2\theta < 15°$; in this region Si reflections do not yet occur, which was confirmed by a separate X-ray diffraction experiment on the uncoated Si substrate.

Figure 3:
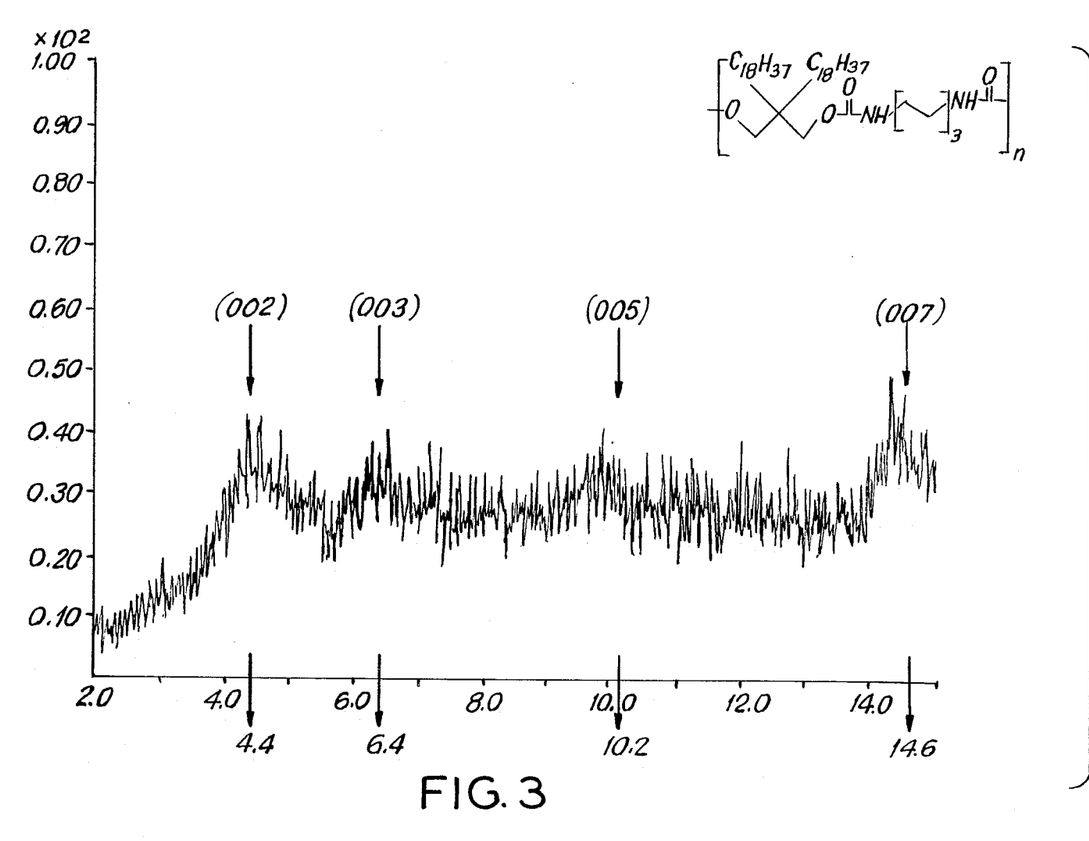
FIG. 3 shows the X-ray diffraction diagram for 30 coatings of the polyurethane used in FIG. 1,1.

The measurements were carried out in reflection; the test specimen was arranged in such a way that the scattering vector was oriented perpendicular to the coating plane of the multiple coatings, and therefore only reflections with the general Miller indices n$\times$001 (n is a positive integer) occured. FIG. 3 shows the X-ray diffraction diagram measured in this way for 30 coatings of PU 1. Four reflections are clearly to be seen. Their low intensity is due to the small number of individual coatings and to the low atomic form factor of the atoms involved (this is proportional to the nuber of electrons of the scattering atoms, thus, a maximum of 8 with oxygen). The broadening of the reflection can be caused by the slightest deviations in the region of fractions of half wavelengths $\lambda/2$ of the X-rays, from the ideal periodicity. With the aid of the geometrical theory of X-ray diffraction (the Bragg equation $2d \sin \theta = n.\theta$ where $d_n{}^c o$, in which the order of reflection is a natural number) the correlation shown in Table 1 is obtained between reflective layers (Bragg angle $\theta$ from the centres of gravity of the reflections determined), interplanar spacings d and order of reflection n and the intercoating distance $C_o$, which corresponds to the thickness of a double coating (type Y coating process).

TABLE 1

| Order of reflection | Bragg angle $\theta$ | Interplanar spacing d (Å) | Intercoating distance $C_o$ (Å) |
|---|---|---|---|
| 2 | 2.2 | 20.6 | 41.2 |
| 3 | 3.2 | 13.8 | 41.4 |
| 4 | — | — | — |
| 5 | 5.1 | 8.7 | 43.3 |
| 6 | — | — | — |
| 7 | 7.3 | 6.1 | 42.2 |

The average value obtained for the intercoating distance is $C_o = 42.0$ Å plus/minus 1.0 Å, is very good agreement with the value determined ellipsometrically. In an analogous manner with PU 6 an average interplanar spacing $C_o$ was determined from 20 coatings as $42.2 \pm 0.8$ Å, which corresponds to an individual coating thickness of 21.1 Å.

The value is in good agreement with the ellipsometrically determined individual contribution per coating to the total coating thickness.

It was thus not only proved that the multiple coatings built up from the polyurethane can be transferred reproducibly coating by coating to solid supports, but additionally that by the molecular order of polymerized molecules compressed into a solid-like phase is also retained during this procedure. Structural investigations of this type on polymers of the type described are not known from the literature.

Figure 4:
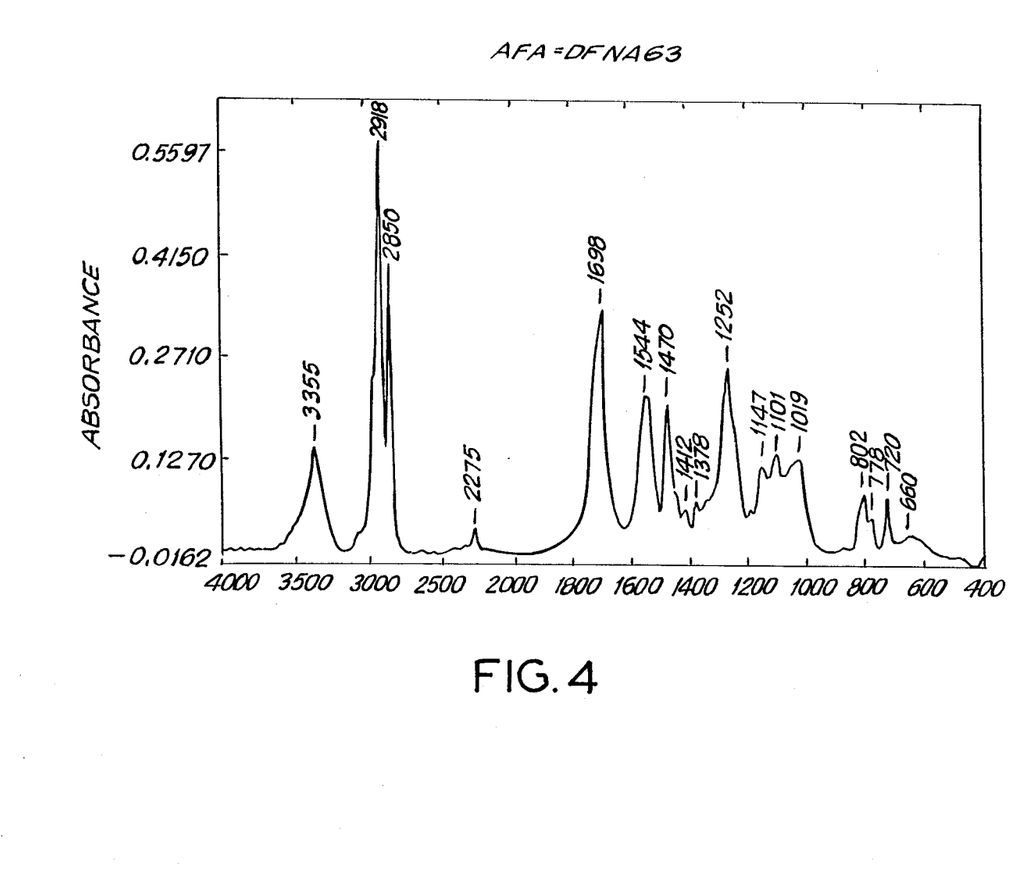
FIG. 4 shows the Fourier transformation IR spectrum of a KBr pressed compact.
Figure 5:
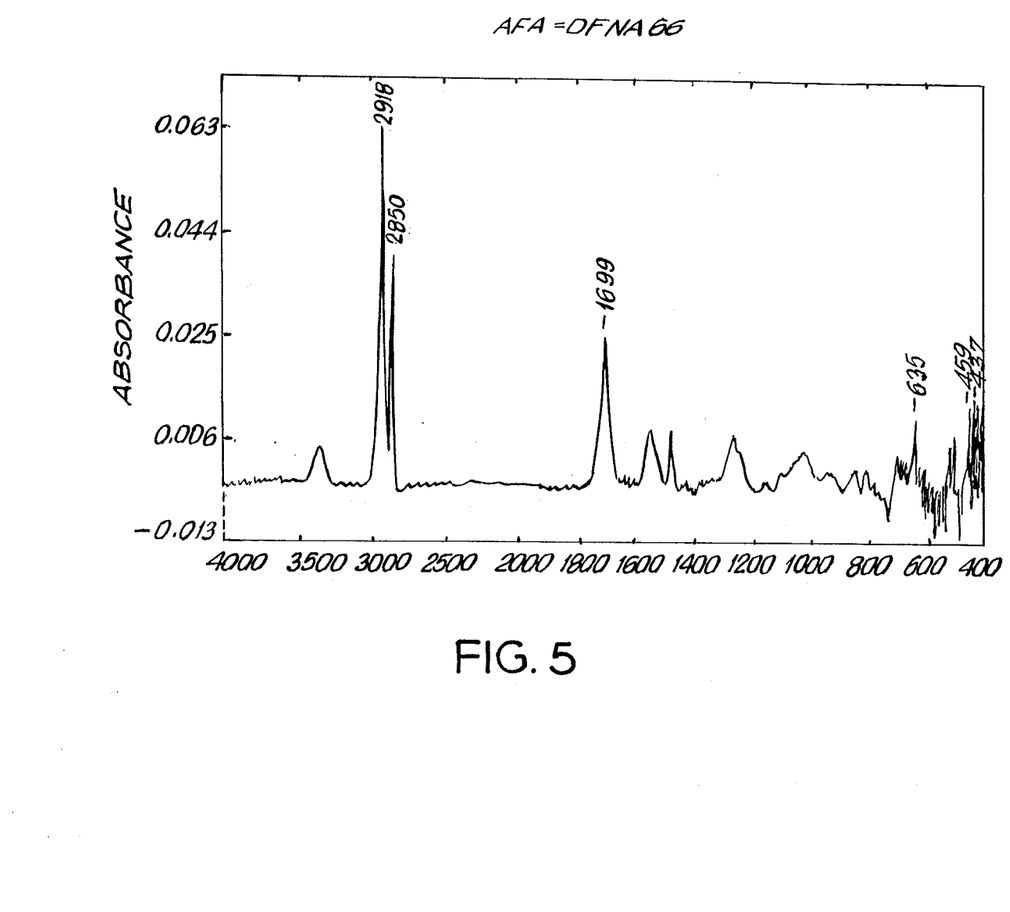
FIG. 5 shows the spectrum of a multiple coating which is a differential spectrum obtained after substraction of the characteristic spectrum of the silicon support.

The Fourier transformation IR spectra of a KBr pressed compact (above) are shown in FIG. 4 and those of a multiple coating of 52 coatings of PU 1 on silicon polished on one side (orientation 111) are shown in FIG. 5. The spectra were recorded in transmission with a Bruker FT-IR spectrometer (Bruker IFS 85).

The spectrum of the multiple coating (FIG. 5) represents a differential spectrum, which was obtained after substraction of the characteristic spectrum of the silicon support.

In both spectra the absorption peaks characteristic of the polyurethane can clearly be recognized in the expected frequency ranges:

NH 3355 (3360)cm$^{-1}$; CH 2918, 2850 cm$^{-1}$; CO 1698 (1699) cm$^{-1}$.

The values given in brackets were taken from the spectrum of the multiple coating.

What is claimed is:

1. A coated support with ultra-thin, single-layer or multi-layer coating of organic polymer material, characterized in that, as polymer, a polyurethane of the structure is used in which
A is the skeleton of an aliphatic, araliphatic or aromatic diol,
B is the skeleton of an aliphatic, araliphatic or aromatic diisocyanate,
n assumes values from 2–150 preferably 3–100, and at least one of the substituents $R^1$ to $R^4$ represents an essentially normal-chain aliphatic radical and the others in each case denote hydrogen, the aliphatic radical having at least 4 carbon atoms and the number of carbon atoms from the terminal methyl group of the aliphatic radical via the skeleton A or B up to the urethane linkage being 6 to 40, it being possible for this chain of carbon atoms to contain an O atom or N atom in the region of the skeleton A or B, and it being further possible for $R^1$ and $R^2$ jointly to form an alkylene chain and for $R^3$ and $R^4$ jointly to form an alkylene chain.

2. The coated supported according to claim 1, characterized in that the number of carbon atoms between the terminal methyl group and the urethane linkage is 8–30.

3. The coated support according to claim 2, characterized in that the number of carbon atoms between the terminal methyl group and the urethane linkage is 8–24.

4. The coated support according to claim 1, characterized in that a polyurethane is used in which the essentially normal-chain aliphatic radicals are linked with the skeleton of the diol.

5. The coated support according to claim 4, characterized in that the skeleton of the diol support two essentially normal-chain aliphatic radicals.

6. The coated support according to claim 1, characterized in that the substituents $R^1$ to $R^4$ are strictly normal-chain.

7. The coated support according to claim 1, characterized in that the polyurethanes are used as a mixture with different degrees of polymerization n within the range n=2–150, preferably n=3–100.

8. A process for the production of coated supports with ultra-thin, single-layer or multi-layer coating of an organic polymer material, characterized in that a solution of polyurethanes of the structure in which
A is the skeleton of an aliphatic, araliphatic or aromatic diol,
B is the skeleton of an aliphatic, araliphatic or aromatic diisocyanate,
n assumes values of 2–150, preferably 3–100, and at least one of the substituents $R^1$ to $R^4$ represents an essentially normal-chain aliphatic radical and the others in each case denote hydrogen, the aliphatic radical having at least 4 carbon atoms and the number of carbon atoms from the terminal methyl group of the aliphatic radical via the skeleton A or B up to the urethane linkage being 6 to 40, it being possible for this chain of carbon atoms to contain an O atom or N atom in the region of the skeleton A or B, and it being further possible for $R^1$ and $R^2$ jointly to form an alkylene chain and for $R^3$ and $R^4$ jointly to form an alkylene chain, is applied to the surface of a liquid in which neither the polyurethane nor its solvent dissolve and a substrate is coated by the Langmuir-Blodgett technique with the desired number of coating layers.

9. The process for the production of coated supports according to claim 7, characterized in that the liquid in which neither the polyurethanes nor its solvent dissolve is water.

10. Polyurethanes as intermediates for the coated supports, of the formula in which A is the skeleton of an aliphatic, araliphatic or aromatic diol, B is the skeleton of an aliphatic, araliphatic or aromatic diisocyanate, n assumes values of 2-150, preferably 3-100, and at least one of the substituents $R^1$ to $R^4$ represents an essentially normal-chain aliphatic radical and the others in each case denote hydrogen, the aliphatic radical having at least 4 carbon atoms and the number of carbon atoms from the terminal methyl group of the aliphatic radical via the skeleton A or B up to the urethane linkage being 6 to 40, it being possible for this chain of carbon atoms to contain an O atom or N atom in the region of the skeleton A or B, and it being further possible for $R^1$ and $R^2$ jointly to form an alkylene chain and for $R^3$ and $R^4$ jointly to form an alkylene chain.

* * * * *